United States Patent [19]

Kobayashi et al.

[11] Patent Number: 4,590,807
[45] Date of Patent: May 27, 1986

[54] TORQUE SENSOR OF NONCONTACT TYPE

[75] Inventors: Tadahiko Kobayashi, Yokohama; Masashi Sahashi, Fujisawa; Koichiro Inomata, Yokohama; Tomokazu Domon, Yokosuka; Hironori Fukuda, Tokyo, all of Japan

[73] Assignee: Kabushiki Kaisha Toshiba, Kawasaki, Japan

[21] Appl. No.: 682,269

[22] Filed: Dec. 17, 1984

[30] Foreign Application Priority Data

Dec. 17, 1983 [JP] Japan ................... 58-238658
Mar. 13, 1984 [JP] Japan ................... 59-47907
Mar. 19, 1984 [JP] Japan ................... 59-52809

[51] Int. Cl.$^4$ .............................. G01L 3/10
[52] U.S. Cl. ........................ 73/862.36; 324/209
[58] Field of Search ............... 73/DIG. 28, 862.33, 73/862.36, 862.69, 779; 324/209

[56] References Cited

U.S. PATENT DOCUMENTS

| 4,279,163 | 7/1981 | Takekoshi et al. | 324/209 X |
| 4,364,278 | 12/1982 | Horter et al. | 73/862.36 |
| 4,414,855 | 11/1983 | Iwasaki | 73/862.36 |

FOREIGN PATENT DOCUMENTS

| 57-211030 | 12/1982 | Japan | 73/862.36 |
| 0274420 | 6/1970 | U.S.S.R. | 73/862.36 |
| 0321673 | 11/1971 | U.S.S.R. | 73/779 |
| 0473912 | 6/1975 | U.S.S.R. | 73/862.69 |

OTHER PUBLICATIONS

SAE Technical Paper Series 820206, "Noncontact Miniature Torque Sensor for Automotive Application"; W. Fleming and P. Wood (GM); Feb. 22-26, 1982.

Primary Examiner—Charles A. Ruehl
Attorney, Agent, or Firm—Oblon, Fisher, Spivak, McClelland & Maier

[57] ABSTRACT

In a torque sensor of a noncontact type for sensing a torque applied to a shaft, a magnetic ribbon is bonded to a circumferential portion of the peripheral surface of the shaft, and a core member made of a magnetic material is arranged above the shaft surface so that its end faces are faced to the magnetic ribbon. A exciting coil and a detecting coil wound around the core so that a magnetic flux produced by the exciting coil and delivered to the detecting coil is detected by the detecting coil. The magnetic ribbon has a length L0 equal to or smaller than one half of the circumferential length Ls of the shaft 4 and satisfying an inequality given by $$L1 \leq L0 \leq 2L1$$

where L1 is the center-to-center distance between the end faces of the core.

20 Claims, 11 Drawing Figures

F I G. 3
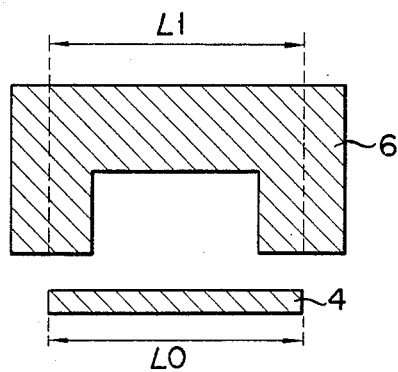
F I G. 4
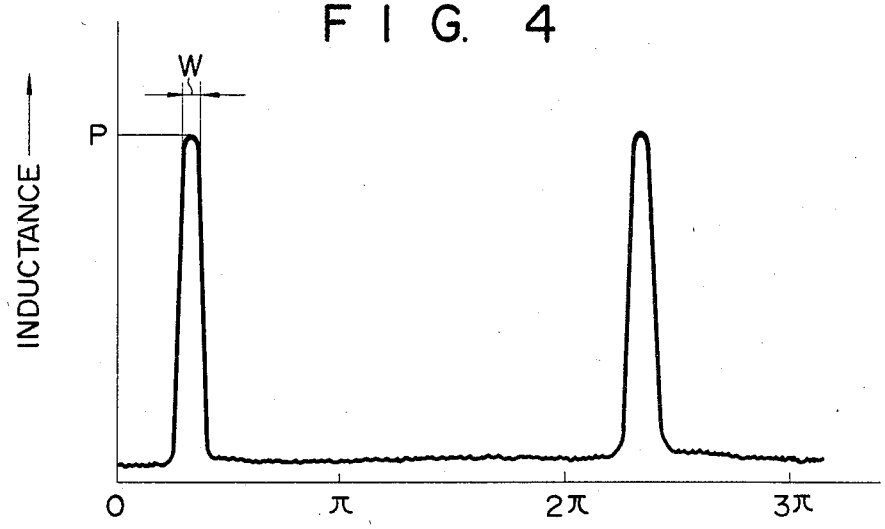
F I G. 5
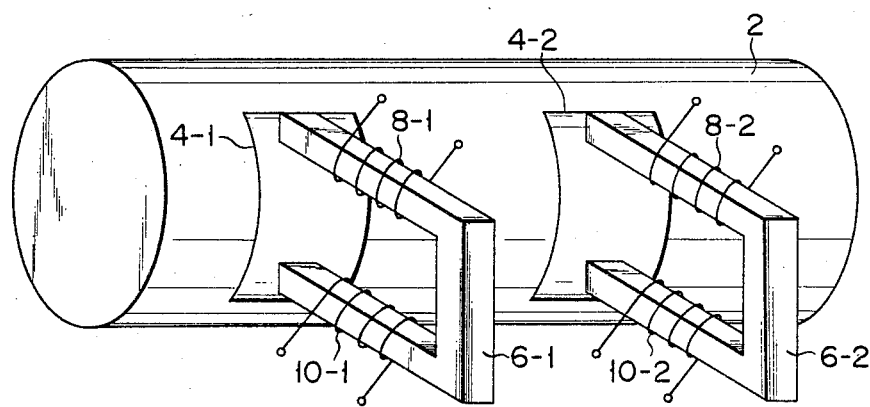

Torque (Kg·m)

1500 rpm

F I G. 10
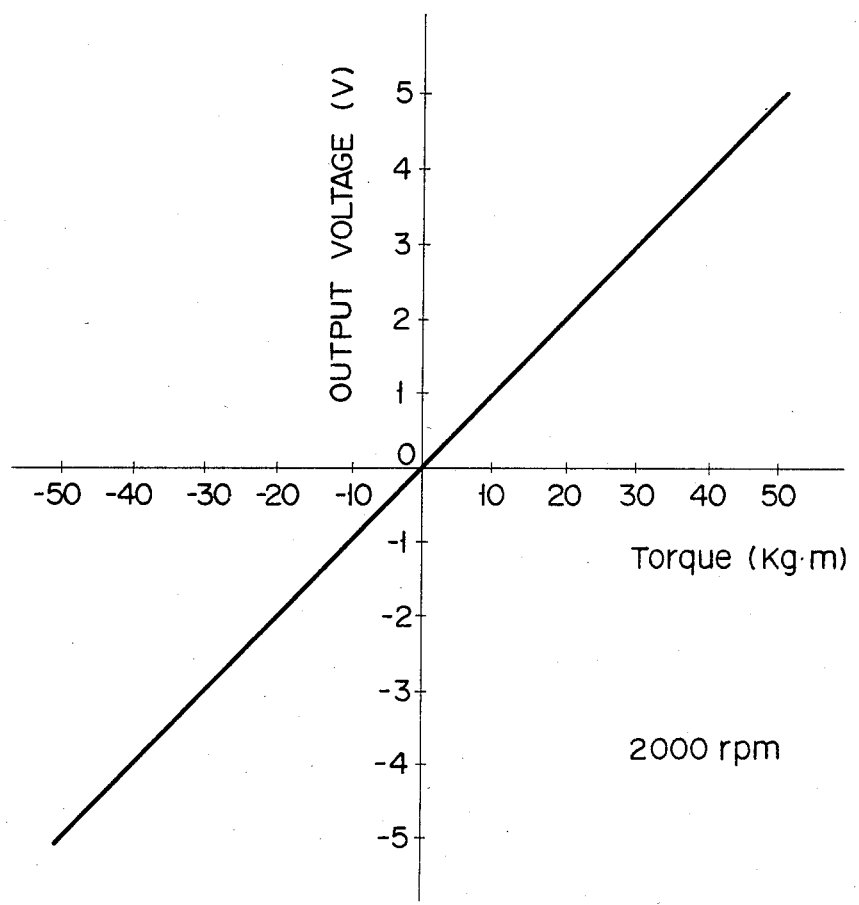

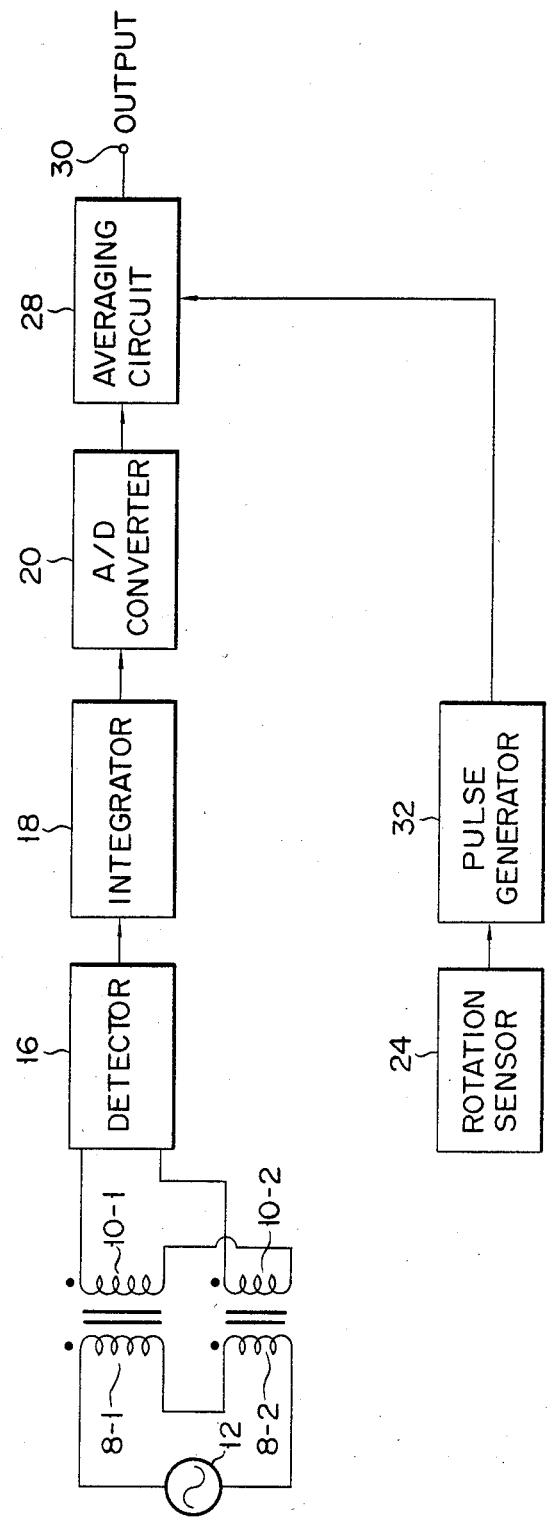

TORQUE SENSOR OF NONCONTACT TYPE

BACKGROUND OF THE INVENTION

This invention relates to a torque sensor of noncontact type and, more particularly, to a torque sensor for converting the torque of a shaft into an electric signal.

Recently, systems for generating torque, e.g., an engine system, are required to detect a torque and produce a detection signal corresponding to the detected torque for controlling the torque generation system. Various torque sensors for detecting a torque of a shaft have been developed to meet the demand noted above. Particularly, there have been proposed torque sensors, which can measure the torque of a shaft accurately in a state out of contact with the shaft, as disclosed in William J. Fleming and Paul W. Wood, "Noncontact Miniature Torque Sensor for Automotive Application" SAE paper 8206206, presented at the Automotive Engineering Congress, K. Harada, I. Sasada, T. Kawajiro, M. Inoue, "A New Torque Transducer Using Stress Sensitive Amorphous Ribbon", IEEE Transactions on Magnetics, Vol. MAG-18, NO. 6, November 1982, and Japanese Patent Disclosure (KOKAI) No. 57-211030 (corresponding U.S. application Ser. No. 268,890 filed June, 1, 1984). The torque sensor provided by William J. et al. in "Noncontact Miniature Torque Sensor for Automotive Application" measures torque applied to an engine crankshaft by making use of the fact that a magnetic characteristic, i.e., magnetic permeability, of the crankshaft is varied according to the torque applied thereto. However, the magnetic property of the measurement zone of the engine crankshaft is not uniform, and there is magnetic anisotropy on the surface and the inside of the crankshaft. Therefore, the torque cannot be measured accurately. In addition, since the engine crankshaft itself does not have high magnetic permeability, it is necessary to generate a magnetic flux sufficient to penetrate the crankshaft measurement zone and be detected. Therefore, the magnetic flux control means is inevitably large in scale. In the torque sensor disclosed by K. Harada et al. M. Inoue in "A New Torque Transducer Using Stress Sensitive Amorphous Ribbons" and Japanese Patent Disclosure (KOKAI) No. 57-211030, an amorphous magnetic ribbon is arranged along the entire circumference of a portion of a shaft, and a coil assembly is provided around and coaxially with the shaft. The coil assembly generates a magnetic flux parallel to the axis of the shaft, and the permeability of the amorphous magnetic ribbon that is changed, according to the torque coupled to the shaft, is measured. Although this torque sensor can solve the problem noted above, since the coil assembly generates a magnetic flux parallel to the axis of the shaft, which has a relatively high magnetic reluctance, a comparatively large exciting current has to be supplied to the coil assembly. In addition, since the coil assembly is provided around the shaft, space for providing the coil assembly is necessary around the shaft. Therefore, the torque sensor cannot be readily assembled in the system which generates the torque, and depending on systems, the space for assembling the torque sensor cannot be ensured. Further, the amorphous magnetic ribbon arranged along the entire circumference of the shaft has to be given an induced magnetic anisotropy in a predetermined direction. However, it is difficult to give the amorphous magnetic ribbon arranged along the entire circumference of the shaft, i.e., a cylindrical amorphous magnetic ribbon, an induced magnetic anisotrophy in a predetermined direction. Further, the magnetic permeability of the amorphus magnetic ribbon arranged along the entire circumference of a shaft may not be uniform when the shaft is made of a Fe system. Variations of the magnetic permeability are liable to result without variations of the torque while the entire circumference of the shaft is under measurement due to lack of uniformity of the magnetic property of the shaft. Therefore, noise is introduced into the torque detection output, and the signal-to-noise ratio is reduced.

SUMMARY OF THE INVENTION

An object of the invention is to provide a torque sensor of a noncontact type, which can be readily disposed in a comparatively small space and can measure the torque of a shaft with a comparatively small exciting current and also with a sufficient signal-to-noise ratio.

According to the invention, there is provided a torque sensor of the noncontact type for sensing a torque, coupled to a shaft having a circumferential length Ls, which comprises:

a first magnetic ribbon provided on a circumferential portion of the peripheral surface of the shaft and made of a magnetic material, said first magnetic ribbon having a circumferential dimension L0 equal to or smaller than one half of the circumferential length Ls of the shaft and being preliminarily given an induced magnetic anisotropy in a direction at an angle with respect to the circumferential direction;

a first core member made of a magnetic material and having end faces which face the first magnetic ribbon and a gap exists between the end faces, the center-to-center distance L1 between the end faces of the first core member being $$L1 \leq L0 \leq 2LZ$$

with respect to the circumferential dimension L0 of the first magnetic ribbon;

a first exciting coil wound on the first core member for producing a magnetic flux; and a first detecting coil wound on the first core member for detecting the magnetic flux produced by the first exciting coil and coupled to the first core member through the first magnetic ribbon to produce an output signal.

There is also provided a torque sensor of the noncontact type, which senses a torque, comprising:

a first magnetic ribbon arranged in the circumferential direction of the peripheral surface of a shaft and made of a magnetic material, the first magnetic ribbon being preliminarily given an induced magnetic anisotropy in a direction at an angle with respect to the circumferential direction;

a first core member made of a magnetic material and having end faces, which face the first magnetic ribbon, with a gap between the faces;

a first exciting coil wound on the first core member for producing a magnetic flux;

a first detecting coil wound on the first core member for detecting the magnetic flux produced by the first exciting coil and coupled to the first core member through the first magnetic ribbon to produce an output signal;

means for detecting the rotation of the shaft and producing a gate pulse for every rotation of the shaft; and means connected to the first exciting coil and gate pulse generating means for sampling and holding the output signal from the first detecting coil every time a gate pulse is received.

There is further provided, referring to the invention, a torque sensor of the noncontact type, which senses a torque, comprising:

a first magnetic ribbon arranged in the circumferential directin of the peripheral surface of a shaft and made of a magnetic material, said first magnetic ribbon being preliminarily given an induced magnetic anisotropy in a direction and at an angle with respect to the circumferential direction;

a first core member made of a magnetic material and having end faces, which face the first magnetic ribbon, with a gap between the faces;

a first exciting coil wound on the first core member for producing a magnetic flux;

a first detecting coil wound on the first core member for detecting the magnetic flux produced by the first exciting coil and coupled to the first core member through the first magnetic ribbon to produce an output signal;

means for detecting the rotation of the shaft and generating a pulse for each rotation of the shaft; and means connected to the first exciting coil and the detecting means for averaging the output signal from the first detecting coil during each rotation of the shaft.

BRIEF DESCRIPTION OF THE DRAWINGS

FIG. 3 is a schematic sectional view of the core and amorphous magnetic ribbon shown in FIG. 1;

FIG. 4 is a graph showing the relationship between inductance detected by the torque sensor and the rotation angle of the shaft shown in FIG. 1;

FIG. 5 is a perspective view schematically showing another embodiment of a torque sensor of a noncontact type according to the present invention;

FIG. 10 is a graph showing the relationship between the output voltage detected by the detecting circuit shown in FIG. 9 and the torque; and FIG. 11 is a block diagram of another detecting circuit applied to the torque sensor in FIG. 5.

DETAILED DESCRIPTION OF THE PREFERRED EMBODIMENTS

Figure 1:
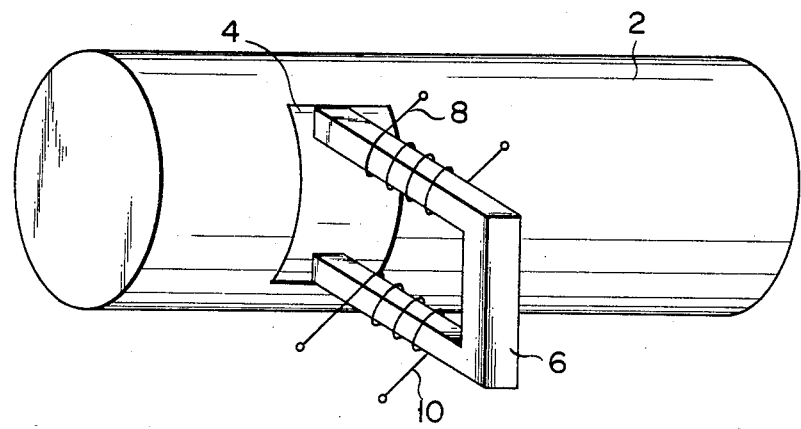
FIG. 1 is a perspective view schematically showing an embodiment of a torque sensor of a noncontact type according to the present invention.

In a torque sensor of a noncontact type as shown in FIG. 1, a magnetic sheet, preferably an amorphous magnetic ribbon 4 is arranged along the circumferential direction of a shaft 2 and is bonded to the shaft 2 to which rotary torque is applied. Further, an induced magnetic anisotropy is applied in advance to the amorphous magnetic ribbon 4 in the direction of angle to the circumferential direction of the ribbon. A U-shaped magnetic core 6 formed of a magnetic material, for example, an oxide magnetic material is disposed in the vicinity of the shaft 2, and the end faces of the core 6 are opposite to the amorphous magnetic ribbon 4 through gaps. An exciting coil 8 for generating a magnetic flux and a detecting coil 10 for detecting the magnetic flux depending upon the magnetic permeability of the amorphous magnetic ribbon 4 are wound around the U-shaped magnetic core 6.

Figure 2:
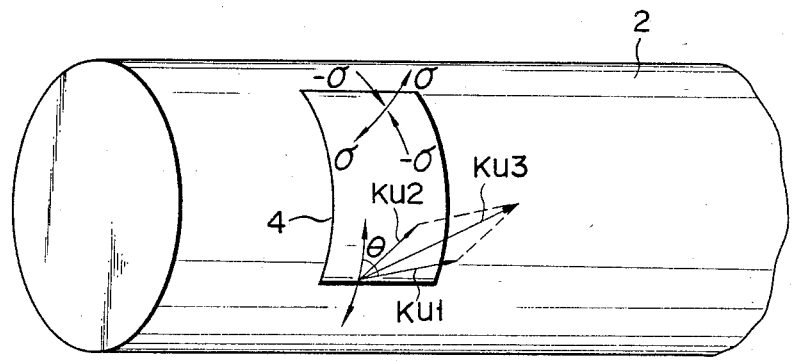
FIG. 2 is an explanatory view showing the principle of the torque sensor in FIG. 1.

Such a torque sensor of a noncontact type detects the torque according to the principle which will be described. Here, an induced magnetic anisotropy $Ku_1$ is applied in advance to the amorphous magnetic ribbon 4 in the direction of angle $\theta > 45°$ along the circumferential direction of the shaft 2, and its saturated magnetostriction is to be $\lambda_s > 0$. When the rotary torque, as shown by an arrow 12, is transmitted to the shaft 2 as shown in FIG. 2, a distortion stress generated at the shaft 2 is transmitted to the amorphous magnetic ribbon 4. A tension $+\sigma$ is produced in a direction of $+45°$ to the circumferential direction in the magnetic ribbon 4, and a compression stress $-\sigma$ is produced in a direction of $-45°$ to the circumferential direction. A magnetic anisotropy $Ku_2$ is induced by the magnetostriction in the magnetic ribbon 2 in response to these tensions $+\sigma$ and the compression stress $-\sigma$. Therefore, a magnetic anisotropy $Ku_3$ is produced as the resultant vector of the magnetic anisotropies $Ku_1$ and $Ku_2$. In general, the magnetic permeability depends upon the direction of the vector of the magnetic anisotropy $Ku_3$, and the variations in the magnetic permeability are present as variations in the mutual inductance in the magnetic ribbon 2 between the exciting coil 8 and the detecting coil 10 in the sensor as shown in FIG. 1. In other words, when a constant AC voltage is applied to the exciting coil 8 to generate the magnetic flux which passes through the magnetic ribbon 4 extending along the circumference of the shaft 2 to be detected by the detecting coil 10, the variations in the torque applied to the shaft 2 are present as variations in the AC voltage induced in the detecting coil 10. From actual experiments, it has been confirmed that linearity exists between the torque applied to the shaft 2 and the change of the voltage induced in the detecting coil 10 and measured by a voltmeter (not shown).

In this embodiment of the invention, the amorphous magnetic ribbon 4 is not arranged along the entire circumference of the shaft 2 but is arranged along a given circumferential area, as shown in FIGS. 1 and 2. The length L0 of the amorphous magnetic ribbon 4 is suitably in a range $$L1 \leq L0 \leq 2L1$$

where L1 is the effective length of the magnetic path of the magnetic core 6.

The length L1 of the effective magnetic path of the core 6 is defined as the length of the magnetic path, which changes in the magnetic flux of the amorphous magnetic ribbon 4 can be effectively detected.

The inequality noted above is based on the following considerations. The core 6 can detect changes in the magnetic flux of the amorphous magnetic ribbon 4 only when the center-to-center distance between the end faces of the core 6 corresponds to the effective magnetic path length and the amorphous magnetic ribbon 4 is positioned between the centers of end faces of the core 6 while the shaft 2 is being rotated. Therefore, if the length L0 of the amorphous magnetic ribbon 4 is smaller than the effective magnetic path length L1 of the minimum sensor core 6, the inductance P as shown in the graph of FIG. 4 is greatly reduced to reduce the sensitivity of detection. On the other hand, when the length L0 of the amorphous magnetic ribbon 4 is more than double the effective magnetic path length L1 of the core 6, i.e., $2L1 \leq L0$, the width W of the peak shown in FIG. 4 is increased and the inductance P is varied to reduce the signal-to-noise ratio. For this reason, it is desired that there holds a condition $L1 \leq L0 \leq 2L1$. Further, considering the fact that the core 6 has a pair of legs, the length L0 is required to be less than one half the length Ls of the circumference of the shaft 2, that is, $L0 \leq \frac{1}{2} Ls$.

Figure 6:
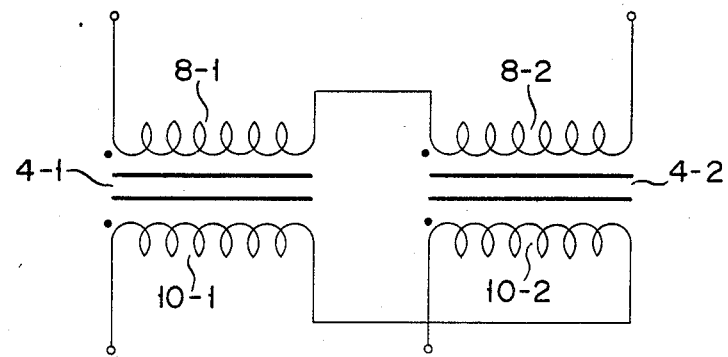
FIG. 6 is a circuit diagram of the detecting exciting coils shown in FIG. 5.

FIG. 5 shows a detailed structure. As is shown, a pair of amorphous magnetic ribbons 4-1 and 4-2 are bonded by adhesive to a shaft 5 of a ferromagnetic material having a diameter of 55 mm. These pair of amorphous magnetic ribbons 4-1 and 4-2 are cut to a length of L0=10 mm from a $(Fe_{0.65}Ni_{0.3}Cr_{0.05})_{75} Si_{11}B_{14}$ amorphous magnetic alloy strip fabricated by a rolling process having a width of 5 mm and a thickness of 30 μm. Induced magnetic anisotropy is applied to these magnetic strips 4-1 and 4-2 in directions at angles $\theta$ and $-\theta$ with respect to the circumferential direction of the shaft 2. End faces of a pair of U-shaped magnetic cores 6-1 and 6-2 are concentrically arranged around the shaft 2 which transmits a torque with a gap of 1 mm provided between each end face of the cores and the outer surface of the magnetic strips 4-1 and 4-2. Exciting coils 8-1 and 8-2 and detecting coils 10-1 and 10-2 are wound on the cores 6-1 and 6-2. The detecting coils 10-1 and 10-2 are differentially connected as shown in FIG. 6. The effective magnetic path length L10 of the cores 10-1 and 10-2 is set to 10 mm. Magnetic flux is transmitted through magnetic ribbons 4-1 and 4-2 in the circumferential direction of the shaft 2.

Figure 7:
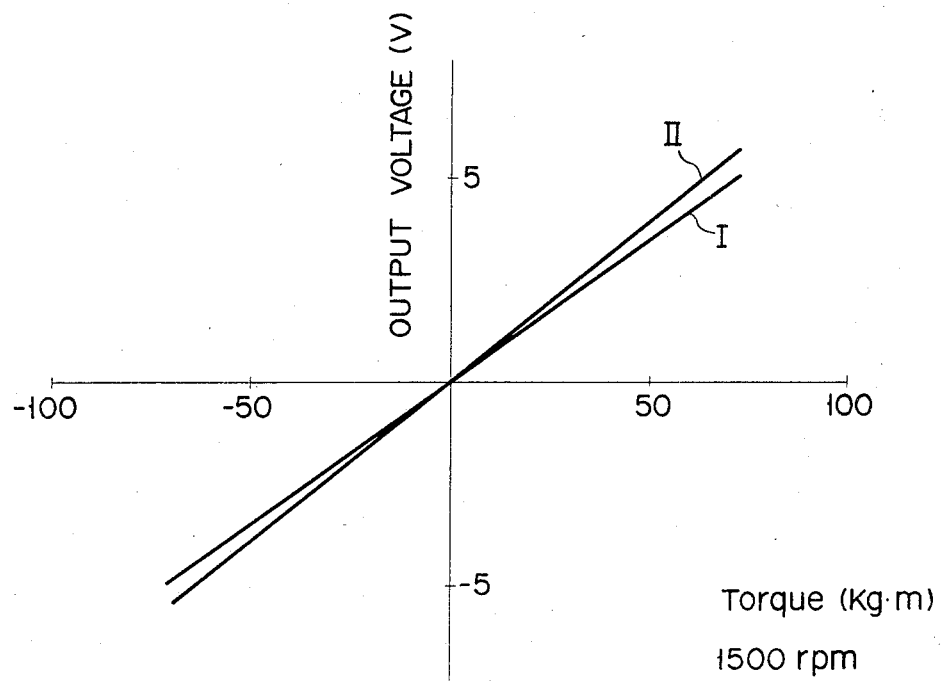
FIGS. 7 and 8 are a graph showing the relationship between the output voltage detected by the detecting coils and the torque.

As a result of measurement of the dynamic torque of the torque transmission shaft 2 at 1,500 rpm using the torque sensor described above, a characteristic, which has a high signal-to-noise ratio, is stable and has excellent linearity, was obtained as shown in plot I in FIG. 7.

In the torque sensor as described, one peak of inductance P per rotation is produced or a plurality of peaks per rotation are produced in the case where a plurality of magnetic strips are arranged along the circumference, as shown in FIG. 4. The rotational rate of the torque transmission shaft can be obtained by supplying this output signal to a counter or the like.

While in the above embodiment, the length L0 of the magnetic strip is made equal to the effective magnetic path length L1 of the core. Satisfactory results similar to this embodiment could also be obtained when L0 was set to L0=2L1, as shown by curve II as shown in FIG. 7.

Figure 8:
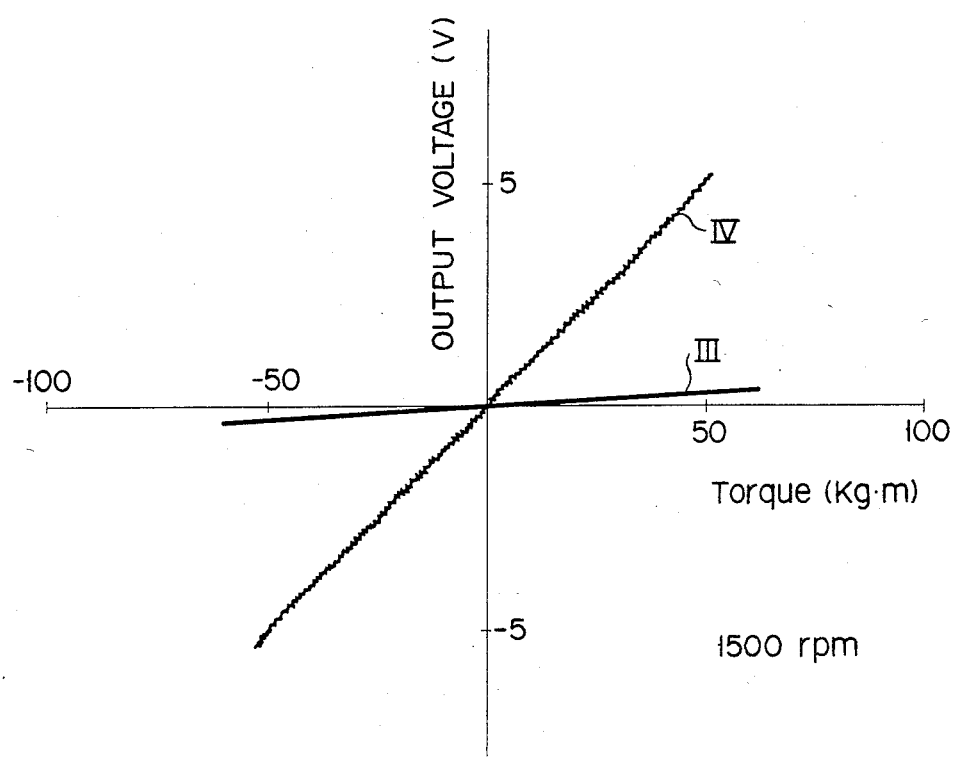

Curve III in FIG. 8 is obtained when $L0=\frac{1}{2} L1$, and curve IV is obtained when L0=3L1. As is obvious from FIG. 8, the sensitivity of torque detection is greatly reduced when the distance L0 is set to $L0=\frac{1}{2} L1$. When the distance L0 is set to L0=3L1, the output is unstable due to a reduced signal-to-noise ratio. From the above grounds, the distance L0 is desirably in a range of $$L1 \leq L0 \leq 2L1.$$

In order to improve the linearity of torque detection characteristic accompanying the forward and reverse torques, it is desirable to use a pair of cores and differentially connect detecting coils as shown in FIG. 6.

A circuit for processing detection signals from the detecting coils 10-1 and 10-2 shown in FIG. 5, will be described with reference to FIG. 9. Exciting coils 8-1 and 8-2 which are cumulatively coupled are connected to an oscillator 12, and the differentially connected detecting coils 10-1 and 10-2 are connected to a detecting circuit 16. When the torque coupled to the shaft 2 is changed while an AC voltage is applied to the exciting coils 8-1 and 8-2, the magnetic permeability of the amorphous magnetic ribbons 4-1 and 4-2 is changed. A sinusoidal detection voltage signal at a level corresponding to the magnetic permeability is detected by the detecting coils 10-1 and 10-2. That is, the detecting coil 10-1 and 10-2 generate a sinusoidal detection voltage signal corresponding to the torque coupled to the shaft 2. The sinusoidal voltage signal is detected by a detector 16. The detection signal from the detector is fed to an integrator 18 connected thereto for conversion to an integral output signal. The integral output signal thus obtained is converted by an analog-to-digital converter 20 connected to the integrator 18 from analog signal into digital signals. The digital signals thus obtained are sampled by a sample/hold circuit 22 connected to the analog-to-digital converter 20 in a particular instant.

The shaft 2 to which torque is applied is provided with a rotation sensor 24 for detecting the rotation rate of the shaft 2. The rotation sensor 24 generates a rotation signal for every rotation of the shaft 2. A gate pulse generator 26 is connected to the rotation sensor 24, and it generates a gate pulse having a predetermined pulse width every time it receives a rotation signal. The gate pulse generator 26 is connected to the sample/hold circuit 22, and the digital signal is sampled and held by the sample/hold circuit 22 in response to the gate pulse. The sampled and held digital voltage output is provided from an output terminal. Where the amorphous magnetic ribbons 4-1 and 4-2 are arranged along the entire circumference of the shaft 2, the rotational rate may be detected at any point. It is necessary that the rotation signal is generated to generate a gate pulse while the amorphous magnetic ribbons 4-1 and 4-2 are temporally disposed between the centers of end faces of the cores 6-1 and 6-2. When the amorphous magnetic ribbons 4-1 and 4-2 are arranged along only the circumference portion of the shaft 2. Accordingly, in the above circuit, magnetic characteristics of a particular circumferential portion of the amorphous magnetic ribbons 4-1 and 4-2 are sampled and held as digital signal in the sample/hold circuit 22 for each rotation of the shaft 2 to detect a torque applied to the shaft 2. In other words, a pulse signal is generated in synchronism to the rotational rate of the shaft 2, to which the torque is applied, and in response to this pulse, a magnetic characteristic change of the particular circumferential portion of the amorphous mangetic ribbons 4-1 and 4-2 is sampled. The magnetic characteristic change of the particular portion of the amorphous magnetic ribbons 4-1 and 4-2 thus can be detected in an equivalently stationary state. Thus, it is possible to measure the torque accurately even if the magnetic permeability detected by the detecting coils 10-1 and 10-2 is not constant over the entire circumference of the shaft 2. Particularly, even where the shaft 2 is made of a ferromagnetic material, e.g., a Fe system, it is possible to prevent output fluctuations stemming from the lack of uniformity of the magnetic permeabilitiy and obtain stable torque detection with a large signal-to-noise ratio. Further, the torque sensor itself may have a reduced size and be accommodated in a small space.

Figure 9:
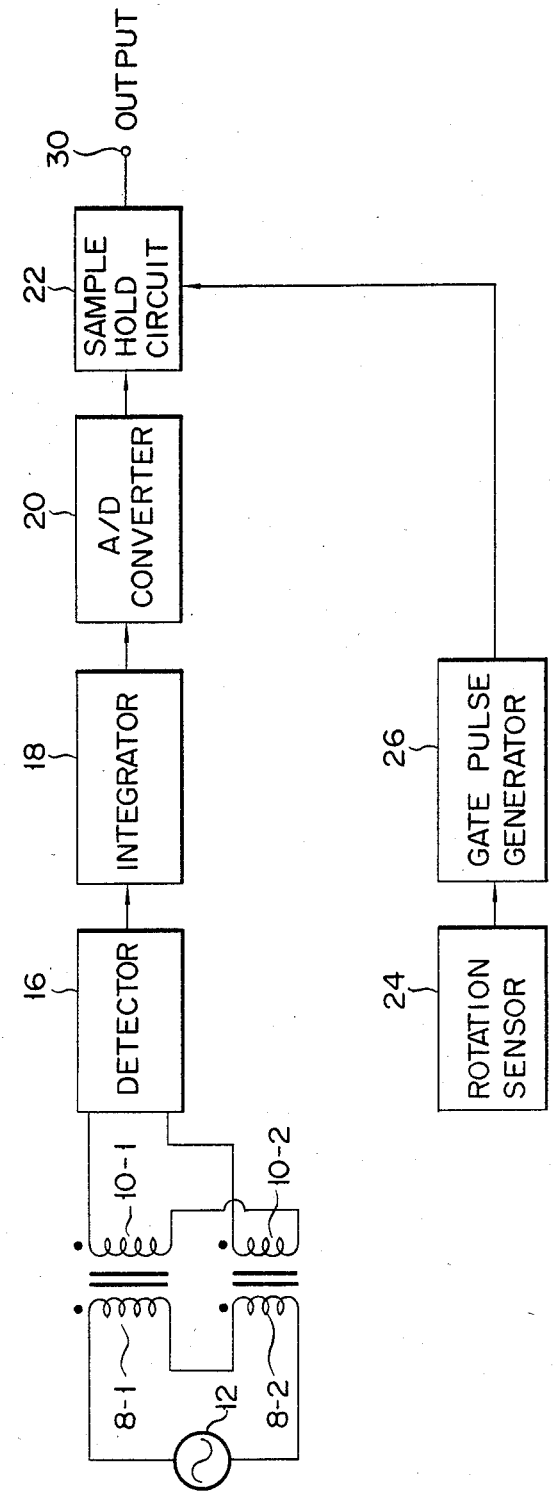
FIG. 9 is a block diagram of a detecting circuit applied to the torque sensor in FIG. 5.

It is found that when the torque applied to the shaft 2 is detected with the torque sensor using the circuit of FIG. 9 while the shaft 2 is rotated at 2,000 rpm, the output voltage changes linearly according to a changing torque as shown in FIG. 10.

A modification of the circuit for processing the detection signal from the detecting coils employed in the torque sensor according to the invention, will now be described with reference to FIG. 11. In FIG. 11, reference numerals like those in FIG. 9 designate such parts. In the circuit of FIG. 11, an averaging circuit 28 is used in stead of the sample/hold circuit. The averaging circuit 28 includes two a arithmetic processing units, to which a pulse generator 32 is connected. When a gate pulse is fed to the averaging circuit 28, the first arithmetic processing unit is held enable and the second arithmetic processing unit is held disenable and when the next pulse is fed to the averaging circuit 28, the first arithmetic processing unit is held disenabled and the second arithmetic processing unit is held enabled. During the one of the arithmetic processing units being enable state, the digital detection signals are fed from the A/D converter 20 to the averaging circuit and are accumulated and processed by the enabled arithmetic processing unit of the averaging circuit. As a result, the averaging circuit 28 provides an averaging voltage signal to output terminal 30.

In the above circuit, magnetic characteristics of a the amorphous magnetic ribbons 4-1 and 4-2 secured to the shaft 2 to which torque is applied, are averaged by the averaging circuit 28 for each rotation of the shaft 2, whereby an average voltage digital signal corresponding to the magnetic characteristics of the amorphous magnetic ribbons 4-1 and 4-2 is provided from the output terminal 30. That is, a pulse signal is generated in synchronism of the rotational rate of the shaft 2 to which torque is applied, and the magnetic characteristics of the particular circumferential portion of the amorphous magnetic ribbons 4-1 and 4-2 are averaged in response to the pulse. Thus, even if the magnetic permeability detected by the detecting coils 10-1 and 10-2 is not constant over the entire circumference of the shaft 2, the torque can be measured accurately by averaging and without being affected by the lack of uniformity of the magnetic permeability. Particularly, even where the shaft 2 to which torque is applied is made of a ferromagnetic material, e.g., a Fe system, it is possible to prevent output fluctuations stemming from the lack of uniformity of the magnetic permeability and obtain stable torque detection with a large signal-to-noise ratio. Further, the torque sensor itself may have a reduced size and be accommodated in a small space. In the combination of the magnetic ribbon provided on a circumferentical portion of the peripheral surface of the shaft and the detecting circuit having the averaging circuit, it is possible to easily detect a change of the torque in a predetermined rotation angle range of the shaft.

It is found that when the torque applied to the shaft 2 is detected with the torque sensor using the circuit of FIG. 11 while the shaft 2 is rotated at 2,000 rpm, the output voltage changes linearly according to a changing torque as shown in FIG. 10.

The amorphous magnetic ribbon 4 and core 6 may be made of Permalloy, Sendust and Fe-Si alloys as well as amorphous magnetic alloy materials. As has been shown, the circuits of FIGS. 9 and 11 may be employed not only where the amorphous magnetic ribbons 4-1 and 4-2 are arranged over a part of the circumference of the shfat 2, but also where they are arranged over its entire circumference.

What is claimed is:

1. A torque sensor of noncontact type for sensing a torque applied to a shaft having a circumferential length Ls, comprising:
   a first magnetic ribbon provided on a circumferential portion of the peripheral surface of said shaft and made of a magnetic material, said first magnetic ribbon having a circumferential dimension L0 equal to or smaller than one-half of the circumferential length Ls of said shaft and being preliminarily given an induced magnetic anisotropy in a direction at an angle with respect to the circumferential direction;
   a first core member made of a magnetic material and having end faces, which face said first magnetic ribbon, with a gap between the faces, the center-to-center distance L1 between said end faces of said first core member being $$L1 \leq L0 \leq 2L1$$

with respect to the circumferential dimension L0 of said first magnetic ribbon;
   a first exciting coil wound on said first core member for producing a magnetic flux; and
   a first detecting coil wound on said first core member for detecting the magnetic flux produced by said first exciting coil and delivered to said first core member through said first magnetic ribbon to produce an output signal.

2. The torque sensor according to claim 1, which further comprises:
   a second magnetic ribbon provided on a circumferential portion of the peripheral surface of said shaft and made of a magnetic material, said second magnetic ribbon having a circumferential dimension L0 equal to or smaller than one-half of the circumferential length Ls of said shaft and being preliminarily given an induced magnetic anisotropy in a direction and at an angle $\theta$ with respect to the circumferential direction;
   a second core member made of a magnetic material having end faces, which face said first magnetic ribbon, with a gap between the faces, the center-to-center distance L1 between said end faces of said second core member being $$L1 \leq L0 \leq 2L1$$

with respect to the circumferential dimension L0 of said first magnetic ribbon;
   a second exciting coil wound on said second core member for producing a magnetic flux; and
   a second detecting coil wound on said second core member for detecting the magnetic flux produced by said first exciting coil and coupled to said second core member through said second magnetic ribbon to produce an output signal.

3. The torque sensor according to claim 1, wherein said first magnetic ribbon essentially consists of a material selected from a group consisting of amorphous magnetic alloys, Permalloy, and Fe-Si alloys.

4. The torque sensor according to claim 1, wherein said first core member consists of a material selected from a group consisting of amorphous magnetic alloys, Permalloy, Sendust and Fe-Si alloys.

5. The torque sensor according to claim 2, wherein said first and second magnetic ribbons essentially consist of a material selected from a group consisting of amorphous magnetic alloys, Permalloy, Sendust and Fe-Si alloys.

6. The torque sensor according to claim 2, wherein said first and second core members consist of a material selected from a group consisting of amorphous magnetic alloys, Permalloy, Sendust and Fe-Si alloys.

7. A torque sensor of a noncontact type for sensing a torque, comprising:
  a first magnetic ribbon arranged in the circumferential direction of the peripheral surface of a shaft and made of a magnetic material, said first magnetic ribbon being preliminarily given an induced magnetic anisotropy in a direction and at an angle $\theta$ with respect to the circumferential direction;
  a first core member made of a magnetic material and having end faces, which face said first magnetic ribbon, with a gap between the faces;
  a first exciting coil wound on said first core member for producing a magnetic flux;
  a first detecting coil wound on said first core member for detecting the magnetic flux produced by said first exciting coil and coupled to said first core member through said first magnetic ribbon to produce an output signal;
  means for detecting the rotation of said shaft and producing a gate pulse for every rotation of said shaft; and
  means connected to said first detecting coil and gate pulse generating means for sampling and holding the output signal from said first detecting coil every time a gate pulse is received.

8. The torque sensor according to claim 7, which further comprises means connected between said first detecting coil and sampling and holding means for converting the output signal from said first detecting coil into a digital signal.

9. The torque sensor according to claim 7, wherein said first magnetic ribbon is arranged over at least a part of the circumference of said shaft.

10. The torque sensor according to claim 9, wherein said gate pulse generating means generates a gate pulse while said first magnetic ribbon is found between the centers of end faces of said first core member.

11. The torque sensor according to claim 7, wherein said shaft has a circumferential length Ls, and the center-to-center distance L1 between said end faces of said first core member satisfies a condition $$L1 \leq L0 \leq 2L1$$

where L0 is the circumferential dimension of said first magnetic ribbon.

12. A torque sensor according to claim 7, which further comprises:
  a second magnetic ribbon arranged in the circumferential direction of the peripheral surface of said shaft and made of a magnetic material, said second magnetic ribbon being preliminarily given an induced magnetic anisotropy in a direction at an angle with respect to the circumferential direction;
  a second core member made of a magnetic material and having end faces, which face said second magnetic ribbon, with a gap between the faces;
  a second exciting coil wound on said second core member for producing a magnetic flux; and
  a second detecting coil wound on said second core member for detecting the magnetic flux produced by said second exciting coil and coupled to said second core member through said second magnetic ribbon to produce an output signal.

13. The torque sensor according to claim 7, wherein said sampling and holding means is connected to said first and second exciting coils and gate pulse generating means.

14. A torque sensor of a noncontact type for sensing a torque, comprising:
  a first magnetic ribbon arranged in the circumferential direction of the peripheral surface of a shaft and made of a magnetic material, said first magnetic ribbon being preliminarily given an induced magnetic anisotropy in a direction and at an angle $\theta$ with respect to the circumferential direction;
  a first core member made of a magnetic material and having end faces, which face said first magnetic ribbon, with a gap between the faces;
  a first exciting coil wound on said first core member for producing a magnetic flux;
  a first detecting coil wound on said first core member for detecting the magnetic flux produced by said first exciting coil and delivered to said first core member through said first magnetic ribbon to produce an output signal;
  means for detecting the rotation of said shaft and generating a pulse for each rotation of said shaft; and
  means connected to said first exciting coil and pulse generating means for averaging the output signal from said first detecting coil during each rotation of the shaft.

15. The torque sensor according to claim 14, which further comprises means connected between said first exciting coil and averaging means for converting the output signal from said first detecting coil into a digital signal.

16. The torque sensor according to claim 14, wherein said first magnetic ribbon is arranged over at least a part of the circumference of said shaft.

17. The torque sensor according to claim 16, wherein said pulse generating means generates a pulse while said first magnetic ribbon is found between the centers of end faces of said first core member.

18. The torque sensor according to claim 14, wherein said shaft has a circumferential length Ls, and the center-to-center distance L1 between said end faces of said first core member satisfies a condition $$L1 \leq L0 \leq 2L1$$

where L0 is the circumferential dimension of said first magnetic ribbon.

19. The torque sensor according to claim 14, which further comprises:
  a second magnetic ribbon arranged in the circumferential direction of the peripheral surface of said shaft and made of a magnetic material, said second magnetic ribbon being preliminarily given an induced magnetic anisotropy in a direction and at an angle $\theta$ with respect to the circumferential direction;

a second core member made of a magnetic material and having end faces, which face said second magnetic ribbon, with a gap between the faces;
a second exciting coil wound on said second core member for producing a magnetic flux; and
a second detecting coil wound on said second core member for detecting the magnetic flux produced by said second exciting coil and delivered to said second core member through said second magnetic ribbon to produce an output signal.

20. The torque sensor according to claim 19, wherein said averaging means is connected to said first and second detecting coils and pulse generating means.

* * * * *